US009239714B2

(12) United States Patent
Wang et al.

(10) Patent No.: US 9,239,714 B2

(45) Date of Patent: Jan. 19, 2016

(54) RAPID DEPLOYMENT OF SOFTWARE APPLICATIONS

(75) Inventors: Wai Wang, British Columbia (CA); Ka-Lok Fung, Surrey (CA)

(73) Assignee: Business Objects Software, Dublin (IE)

(*) Notice: Subject to any disclaimer, the term of this patent is extended or adjusted under 35 U.S.C. 154(b) by 494 days.

(21) Appl. No.: 13/589,001

(22) Filed: Aug. 17, 2012

(65) Prior Publication Data

US 2014/0053147 A1 Feb. 20, 2014

(51) Int. Cl.

*G06F 9/445* (2006.01)
*G06F 9/44* (2006.01)

(52) U.S. Cl.

CPC .......... *G06F 8/61* (2013.01)

(58) Field of Classification Search

USPC .......... 717/175

See application file for complete search history.

(56) References Cited

U.S. PATENT DOCUMENTS

| | | | | |
|---|---|---|---|---|
| 6,708,329 | B1* | 3/2004 | Whitehill et al. | 717/136 |
| 6,862,735 | B1* | 3/2005 | Slaughter | G06F 9/4425 712/E9.082 |
| 7,058,485 | B2* | 6/2006 | Thomas | G05B 19/0426 701/1 |
| 8,225,306 | B2* | 7/2012 | Kennedy et al. | 717/174 |
| 2002/0010910 | A1* | 1/2002 | Crudele et al. | 717/4 |
| 2003/0204842 | A1* | 10/2003 | Chenelle et al. | 717/177 |
| 2004/0117338 | A1* | 6/2004 | Kennedy et al. | 707/1 |
| 2005/0044096 | A1* | 2/2005 | Caliendo et al. | 707/102 |
| 2007/0209034 | A1* | 9/2007 | Doganata et al. | 717/174 |
| 2007/0226731 | A1* | 9/2007 | Tseitlin | G06F 8/71 717/171 |
| 2009/0113418 | A1* | 4/2009 | Haase | G06F 8/62 717/178 |
| 2009/0119660 | A1* | 5/2009 | Redpath | 717/175 |
| 2009/0158270 | A1* | 6/2009 | Funk | G06F 8/71 717/174 |
| 2009/0265683 | A1* | 10/2009 | Salgar et al. | 717/104 |
| 2014/0053147 | A1* | 2/2014 | Wang et al. | 717/174 |

OTHER PUBLICATIONS

"Business Intelligence Platform Installation Guide", © SAP AG, SAP Group. (Mar. 14, 2012), 1-72.

"Installation Guide", © 2011 SAP AG, SAP Group, (Nov. 17, 2011), 16 pgs.

Jansen, Slinger, et al., "Benchmarking the Customer Configuration Updating Practices of Product Software Vendors", Seventh International Conference on Composition-Based Software Systems © 2008 IEEE, (2008), 82-91.

Lestideau, Vincent, et al., "Towards automated software component configuration and deployment", Proceedings (PDTSD'02), Orlando, USA, Aug. 1, 2002, (2002), 6 pgs.

Montante, Robert, "A Survey of Portable Software", JCSC 24, (Jan. 3, 2009) © 2008 by the Consortium for Computing Sciences in Colleges., (Jan. 2009), 19-24.

* cited by examiner

*Primary Examiner* — Marina Lee

(74) *Attorney, Agent, or Firm* — Schwegman Lundberg & Woessner, P.A.

(57) ABSTRACT

A system for a rapid deployment of software system includes a rapid deployment preparation module and a rapid deployment module. The rapid deployment preparation module archives a machine-independent portion of a software system preinstalled and preconfigured on a source machine. The rapid deployment module unpacks and installs the machine-independent portion of the software system on a target machine. The rapid deployment module then reconstructs a machine-dependent portion of the software system on the target machine using the target machine specific data.

18 Claims, 7 Drawing Sheets

MACHINE X 202
INSTALLED SOFTWARE SYSTEM 203
RAPID DEPLOYMENT PREPARATION MODULE 204
MACHINE-INDEPENDENT SYSTEM SOFTWARE ARCHIVE 206
MACHINE X SPECIFIC DATA 208
MACHINE A 210
RAPID DEPLOYMENT MODULE 212
MACHINE-INDEPENDENT SYSTEM SOFTWARE ARCHIVE 206
MACHINE A SPECIFIC DATA 216
MACHINE B 218
212
206
MACHINE B SPECIFIC DATA 220

FIG. 1 – PRIOR ART

RAPID DEPLOYMENT OF SOFTWARE APPLICATIONS

FIELD

The present disclosure relates generally to an information technology system tool, and in a specific example embodiment, to a tool for rapid deployment of software system.

BACKGROUND

Deployment of a working business information system is a time consuming process because it involves installation of multiple software package installations as well as many manual configurations of each individual machine that is hosting the business information system. Because, each machine has its own set of parameters and machine-dependent configurations, the installation process cannot be simply automated and repeated across all machines using a universal installation package.

BRIEF DESCRIPTION OF DRAWINGS

The appended drawings merely illustrate example embodiments of the present invention and cannot be considered as limiting its scope.

DETAILED DESCRIPTION

Figure 1:
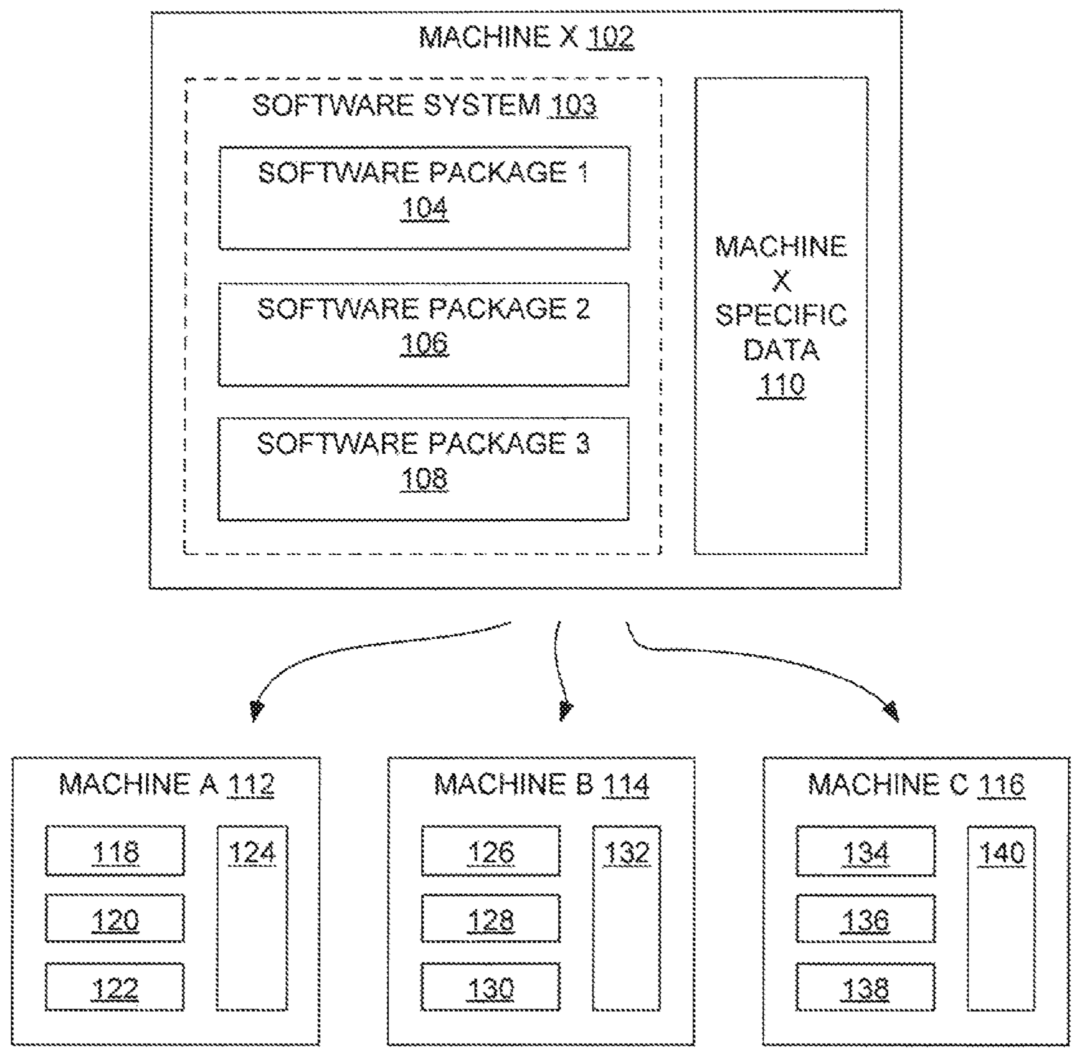
FIG. 1 is a block diagram illustrating a software deployment process in accordance with a prior art.

The description that follows includes systems, methods, techniques, instruction sequences, and computing machine program products that embody illustrative embodiments of the present invention. In the following description, for purposes of explanation, numerous specific details are set forth in order to provide an understanding of various embodiments. It will be evident, however, to those skilled in the art that embodiments of the inventive subject matter may be practiced without these specific details. In general, well-known instruction instances, protocols, structures, and techniques have not been shown in detail.

Example systems and methods for a rapid deployment of software system are described. The rapid deployment system includes a rapid deployment preparation module and a rapid deployment module. The rapid deployment preparation module archives a machine-independent portion of a software system preinstalled and preconfigured on a source machine. The rapid deployment module unpacks and installs the machine-independent portion of the software system on at least one target machine. The rapid deployment module then reconstructs a corresponding machine-dependent portion of the software system on the target machine using the corresponding target machine-specific data. The software system may include, for example, a business application software suite including several business software applications.

The rapid deployment preparation module splits the software system preinstalled and preconfigured on the source machine into the machine-independent portion and the machine-dependent portion.

In one embodiment the rapid deployment preparation module includes an installation module, a configuration module, a cleanup module, and an archive packing module. The installation module installs each software package of the software system on the source machine. The configuration module configures the installed software packages to ensure that the software packages together form a properly working software system on the source machine. The cleanup module shuts down software components of the installed software packages, and deletes machine specific data entity and any database the software relies to run. For example, the cleanup module may delete content of working directories that contain transient files where the transient files dynamically created when the software system runs on the source machine. The archive packing module packs remaining software components, application database, and related files on the source machine after the cleanup module into an archive. In another embodiment, the rapid deployment preparation module also includes a compression module to decrease the size of the archive.

In one embodiment, the rapid deployment module includes an archive unpacking module and a machine-dependent data reconstruction utility module. The archive unpacking module unpacks the archive on the target machine. The machine-dependent data reconstruction utility module generates missing data for the unpacked archive on the target machine where the missing data comprises target-machine specific data.

In one embodiment, the archive unpacking module requests parameters to be applied on the target machine post installation and re-initializes a database of the unpacked archive on the target machine. For example, the machine-dependent data reconstruction utility module updates a hostname in the unpacked archive, adds a license key for the unpacked archive, changes an administrator's password, and configures servers from the unpacked archive. The servers are from Business Objects Enterprise, also marketed as SAP BusinessObjects BI Platform. In another embodiment, the archive unpacking module and the machine-dependent data reconstruction utility module may be combined into a single unit-module.

FIG. 1 is a block diagram illustrating a software deployment process in accordance with a prior art. The deployment of a working business information software system is a time-consuming process that involves installation of multiple software packages and several manual steps. For example, a software system 103 includes software packages 104, 106, and 108. In order to install the software system 103 on host machine X 102, software packages 104, 106, and 108 are manually installed and manually configured to machine X specific data 110.

In order to replicate the Installation of the software system 103 in machine X 102 (the source machine), software packages 104, 106, and 108 need to be repeatedly manually installed and configured on each different destination machine A 112, machine B 114, and machine C 116. As such, software packages 118, 120, and 122 are manually installed and configured to machine A specific data 124. Software packages 126, 128, and 130 are manually installed and configured to machine B specific data 132. Software packages 134, 136 and 138 are manually installed and configured to machine C specific data 140.

Figure 2:
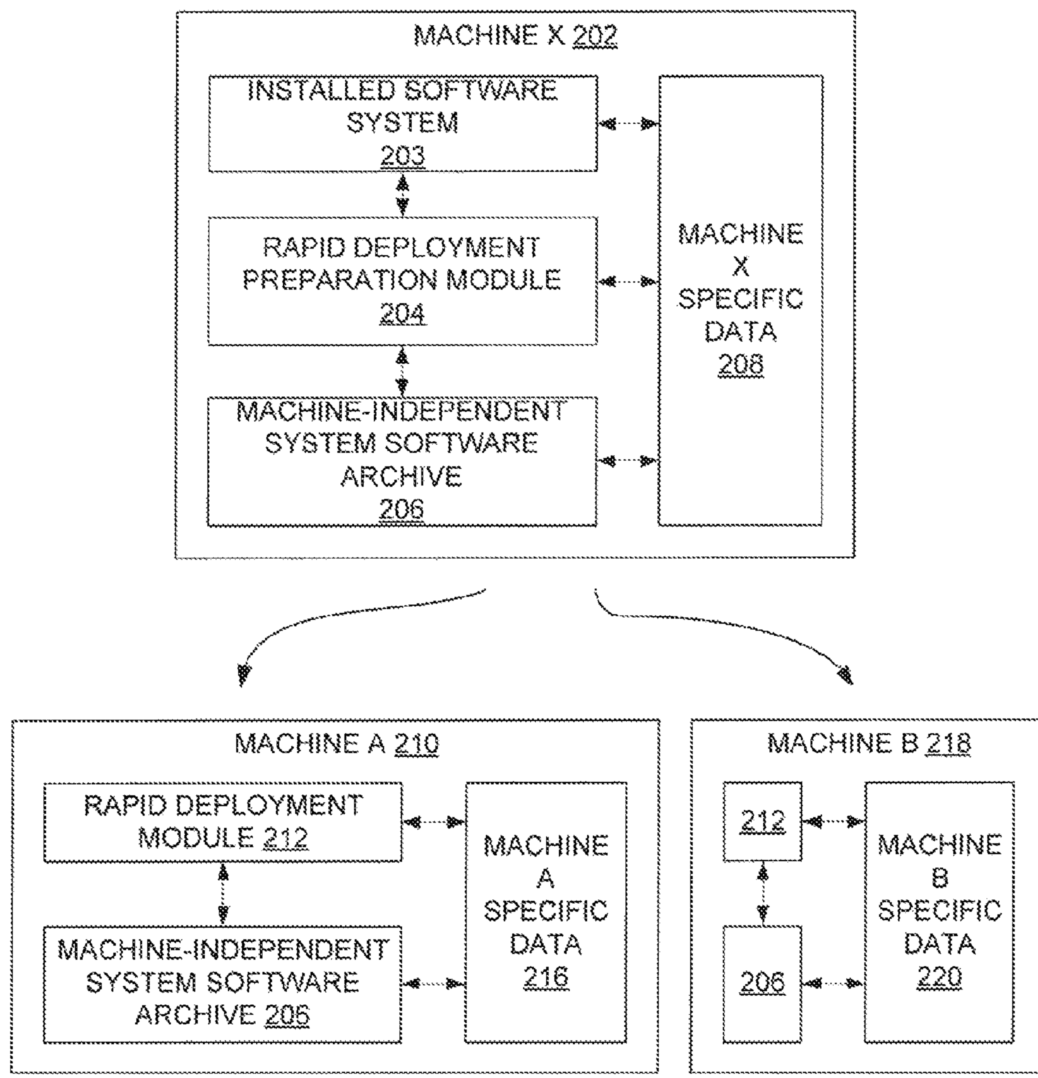
FIG. 2 is a block diagram illustrating an example of a software deployment process in accordance with an example embodiment.

FIG. 2 is a block diagram illustrating an example of a software deployment process in accordance with an example embodiment. A software system 203 is already installed and configured on machine X 202 using, machine X specific data 208. For example, the machine X specific data 208 includes a name and particular specifications among others. In one embodiment, the software system 203 includes several software packages that are manually installed and configured on machine X 202.

The software system 203 may include a business application software system that includes several applications (e.g., email application, business object application). A business object application defines the process of a business task. For example, various participants need to perform several steps in the process of hiring an employee. A manager may request a job requisition for approval from a superior. In one embodiment, the business object application may process a business task with business objects. For example, a business object may correspond to one or more entitles within the business object application that represents things in a business to which the business object application pertains. For example, the business object may map a source data structure in a database to business terms used by non-Information Technology analysts. The business object may also correspond to a function of the database or the business object application. For example, if the business object application is a Human Resources application pertaining to recruiting of candidates for job openings within a company, the business object may correspond to a person (e.g., a job candidate) who has applied for a job opening. The business object may include one or more data items. The data items of the business object may correspond to any data that one or more additional applications maintain with respect to the business object. For example, the data item may be a resume of a person (e.g., a candidate for an open position, at a company) represented by the business object, or the data item may be a time card of a person (e.g., an employee of a company) represented by the business object.

In one embodiment, the email application may be configured to enable the participants of the business task to communicate with each other and others. The email application may include a conventional email server application.

In one embodiment machine X 202 communicates with other host machines where the software system is to be installed via a computer network. The computer network enables communication between systems. Accordingly, the computer network may be a mobile telephone network, a Plain Old Telephone (POTS) network, a wired network, a wireless network (e.g., a WiFi or WiMax network), or any suitable combination thereof. The communication may be based on any communication protocols. Examples of communication protocols include Transmission Control Protocol/Internet Protocol (TCP/IP), HyperText Transfer Protocol (HTTP), File Transfer Protocol (FTP), Simple Mail Transfer Protocol (SMTP), Post Office Protocol (POP), Internet Message Access Protocol (IMAP), Wireless Access Protocol (WAP), Gopher, wireless internet protocols, and instant messaging protocols. The computer network may be implemented using the Internet, a wide area network (WAN), a local area network (LAN), or any suitable combination thereof. As such, installation of the software system 203 on other host machines (e.g., machine A 210 and machine B 218) follows installation of the software system 203 on machine X 202. The host machines do not yet include the software system installed on them.

In one embodiment, the source machine X 202 further includes a rapid deployment preparation module 204, a machine-independent system software archive 206, and a machine X specific data 208.

The rapid deployment preparation module 204 identifies the machine-independent portion from the machine-dependent portion of the software system 203 preinstalled and preconfigured on the source machine X 202. In other words, the rapid deployment preparation module 204 splits the installed software system 203 on the source machine X 202 into the machine-independent portion and the machine-dependent portion.

The machine-independent system software archive 206 then packs the machine-independent portion of the software system 203 preinstalled and preconfigured on the source machine X 202 into the machine-independent system software archive 206.

One example embodiment of the rapid deployment preparation module 204 is described in more detail below with respect to FIG. 3.

The machine-independent system software archive 206 is transferred onto the machines A 210 and B 218. A rapid deployment module 212 on the machines A 210 and B 218 unpacks and installs the machine-independent system software archive 206 on the respective target machines. After unpacking the archive 206, the rapid deployment module 212 then reconstructs a machine-dependent portion of the software system 203 on the corresponding target machine using the corresponding target machine specific data 216 and 220.

One example embodiment of the rapid deployment module 212 is described in more detail below with respect to FIG. 4.

Figure 3:
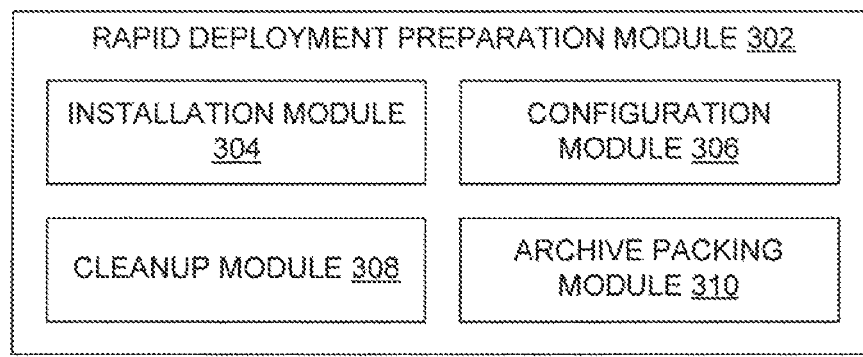
FIG. 3 is a block diagram illustrating a rapid deployment preparation module, in accordance with an example embodiment.

FIG. 3 is a block diagram illustrating a rapid deployment preparation module 302, in accordance with an example embodiment. The rapid deployment preparation module 302 includes an installation module 304, a configuration module 306, a cleanup module 308, and an archive packing module 310.

The installation module 304 installs each software package of the software system on the source machine. For example, the software system may include a business application suite that includes several software packages that may be installed separately and configured manually on the source machine.

The configuration module 306 configures the installed software packages to ensure that the software packages together form a properly working software system on the source machine. For example, the configuration module 306 configures and customizes the installed software packages based on the machine X specific data 208 (FIG. 2).

The cleanup module 308 shuts down the software components of the installed software packages on the source machine and deletes content of working directories that contain transient files. Transient files are dynamically created when the software system runs on the source machine. In another embodiment, the cleanup module 308 deletes data that is specific to the source machine 202.

The archive packing module 310 then archives the machine-independent portion into a machine-independent system software archive 206 (FIG. 2). In one embodiment, the archive packing module 310 packs the remaining software components, application database, and related files on the source machine into an archive.

Figure 4:
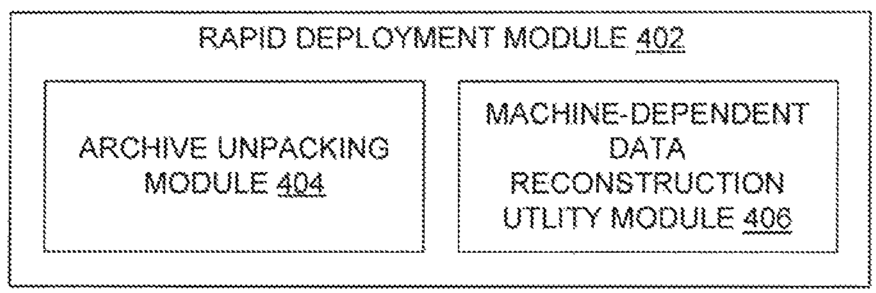
FIG. 4 is a block diagram illustrating a rapid deployment module, in accordance with an example embodiment.

FIG. 4 is a block diagram illustrating a rapid deployment module 402, in accordance with an example embodiment. The rapid deployment module 402 includes an archive unpacking module 404 and a machine-dependent data reconstruction utility module 406.

The archive unpacking module 404 unpacks the machine-independent system software archive 206 on the machines A 210 and B 218 shown in FIG. 2. In one embodiment, the archive unpacking module 404 requests parameters to be applied on the target machine post installation and re-initializes a database of the unpacked archive on the machines A 210 and B 218.

The machine-dependent data reconstruction utility module 406 generates missing data for the unpacked archive on the machines A 210 and B 218. For example, the missing data may include target-machine specific data such as machine A specific data 216 and machine B specific data 220. In one embodiment the machine-dependent data reconstruction utility module 406 can update a host name in the unpacked archive, add a license key for the unpacked archive, change an administrator's password, and configure Business Objects Enterprise servers from the unpacked archive.

Figure 5:
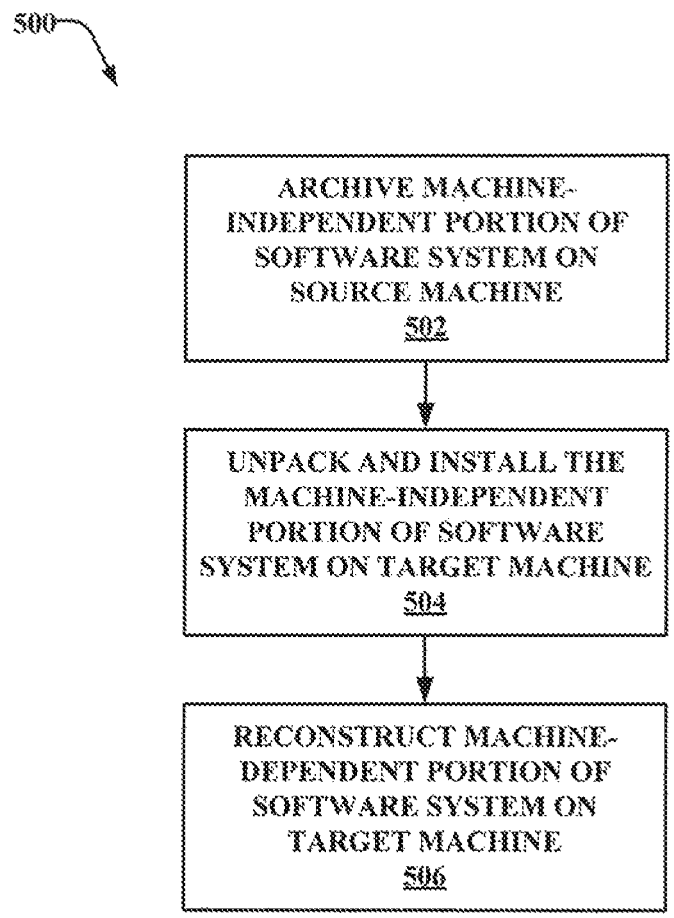
FIG. 5 is a flowchart of a method, in accordance with an example embodiment, for a rapid deployment of software system.

FIG. 5 is a flowchart of a method 500, in accordance with an example embodiment, for rapid deployment of a software system. At operation 502, the software system preinstalled and preconfigured on the source machine is split into the machine-independent portion and the machine-dependent portion. A machine-independent portion of a software system preinstalled and preconfigured on a source machine is identified and packed into an archive. In one embodiment, the archive packing module 310 of the rapid deployment preparation module 302 (FIG. 3) packs the machine-independent portion of the software system into an archive.

At operation 504, the archive is copied or transferred from the source machine to the target machine. The archive is then unpacked and installed on the target machine. In one embodiment, the archive unpacking module 404 of the rapid deployment module 402 (FIG. 4) unpacks and installs the machine-independent portion of the software system on the target machine.

At operation 506, a machine-dependent portion of the software system is reconstructed on the target machine using the target machine specific data. In one embodiment, the machine-dependent data reconstruction utility module 406 of the rapid deployment module 402 (FIG. 4) reconstructs a portion of the software system using the target machine specific data.

Figure 6:
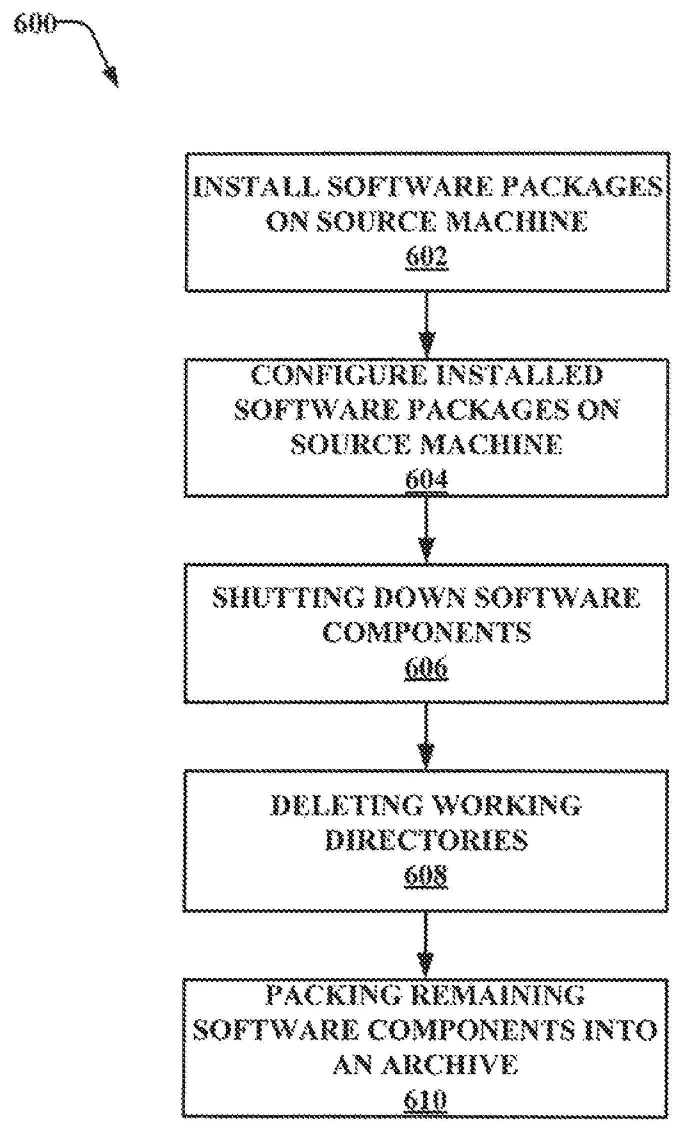
FIG. 6 is a flowchart of a method, in accordance with an example embodiment, for preparing a rapid deployment process on an installed host machine.

FIG. 6 is a flowchart of a method 600, in accordance with an example embodiment, for preparing a rapid deployment process on an installed host machine. At operation 602, each software package of the software system is installed on the source machine. In one embodiment, the installation module 304 of rapid deployment preparation module 302 (FIG. 3) assists with the installation process.

At operation 604, the software system installed on the source machine is configured to ensure that the software packages together form a properly working software system on the source machine. For example, the configuration module 306 of rapid deployment preparation module 302 configures the software system according to specific data from the source machine.

At operation 606, software components of the installed software packages are shut down.

At operation 608, content of working directories that contain transient files is deleted. The transient files are dynamically created when the software system runs on the source machine. In one embodiment, the cleanup module 308 of the rapid deployment preparation module 302 deletes portions of the software system that are machine-dependent (e.g., machine name, address, directory/file location).

At operation 610, the remaining software components, application database, and related flies on the source machine are packed into an archive. In one embodiment, the archive packing module 310 packs the machine-independent portion of the software system into an archive.

Figure 7:
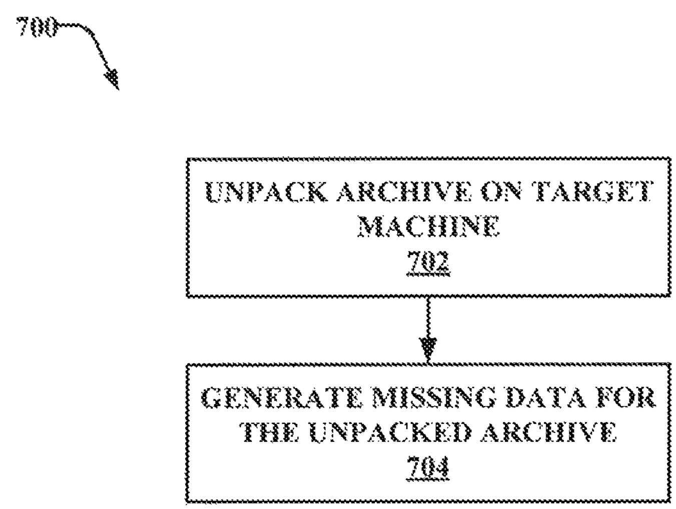
FIG. 7 is a flowchart of a method, in accordance with an example embodiment, for executing the rapid deployment process on an uninstalled host machine.

FIG. 7 is a flowchart of a method 700, in accordance with an example embodiment, for executing the rapid deployment process on an uninstalled host machine. At operation 702, the archive is unpacked on the target machine. In one embodiment, the archive unpacking module 404 (FIG. 4) requests parameters to be applied on the target machine post-installation and re-initializes a database of the unpacked archive on the target machine.

At operation 704, missing data for the unpacked archive are generated on the target machine, the missing data comprising target-machine specific data. In one embodiment, the machine-dependent data reconstruction utility module 406 (FIG. 4) updates a hostname in the unpacked archive, adds a license key for the unpacked archive, changes an administrator's password, and configures Business Objects Enterprise servers from the unpacked archive.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry, (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 8:
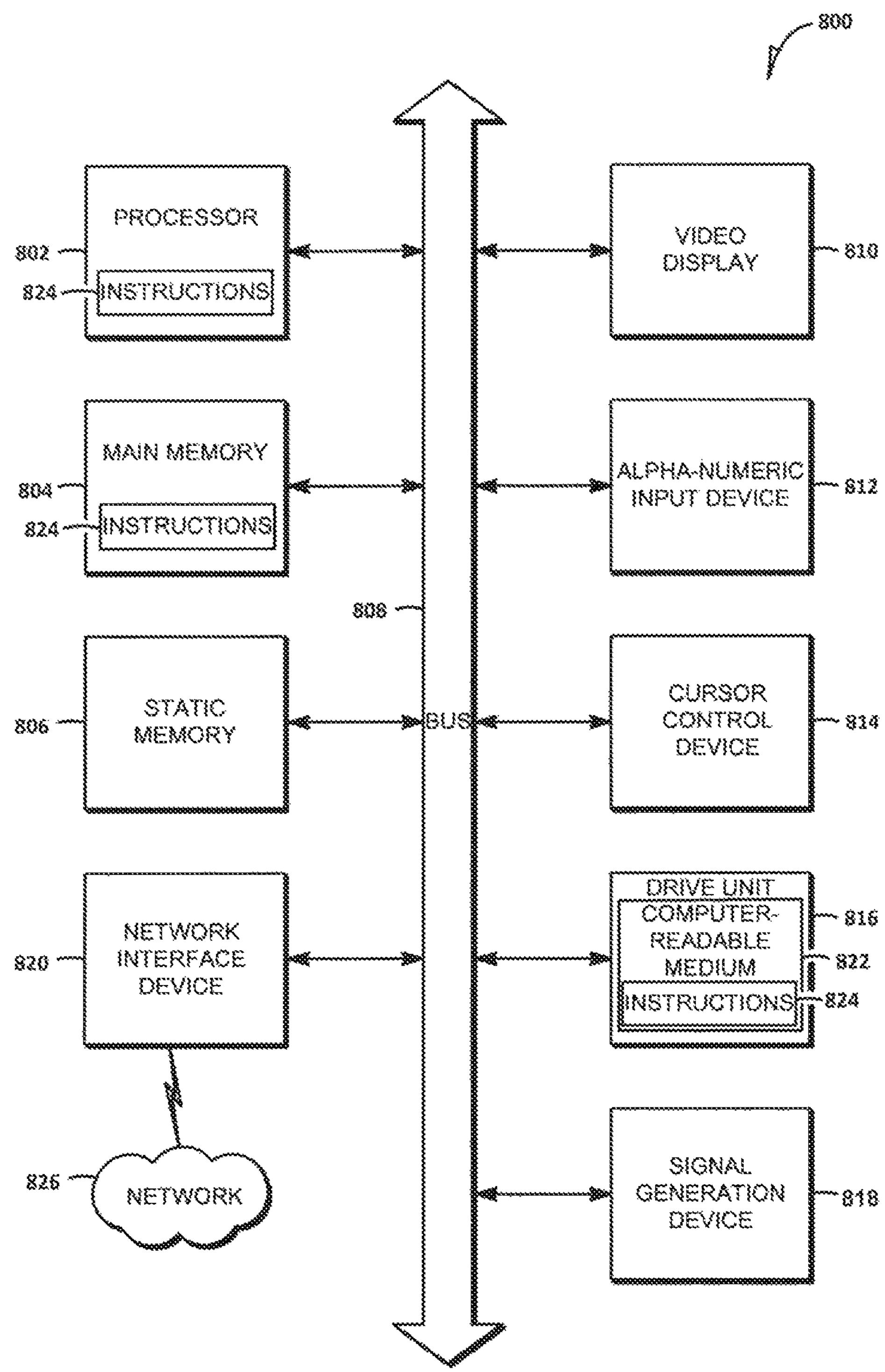
FIG. 8 is a block diagram of a machine in an example form of a computing system within which a set of instructions for causing the machine to perform any one or more of the methodologies discussed herein may be executed.

With reference to FIG. 8, an example embodiment extends to a machine in the example form of a computer system 800 within which instructions 824 for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alphanumeric input device 812 (e.g., a keyboard), a user interface (UI) navigation device or cursor control device 814 (e.g., a mouse), a disk drive unit 816, a signal generation device 818 (e.g., a speaker), and a network interface device 820.

The disk drive unit 816 includes a machine-readable storage medium 822 on which is stored one or more sets of instructions 824 and data structures (e.g., software instructions) embodying or used by my one or more of the methodologies or functions described herein. The Instructions 824 may also reside, completely or at least partially, within the main memory 804 or within the processor 802 during execution thereof by the computer system 800, the main memory 804 and the processor 802 also constituting machine-readable media.

While the machine-readable storage medium 822 is shown in an exemplary embodiment to be a single medium, the term "machine-readable storage medium" may include a single storage medium or multiple media (e.g., a centralized or distributed database, or associated caches and servers) that store the one or more instructions 824. The term "machine-readable storage medium" shall also be taken to include any tangible medium that is capable of storing, encoding, or carrying instructions for execution by the machine and that causes the machine to perform any one or more of the methodologies of embodiments of the present description, or that is capable of storing, encoding, or carrying data structures used by or associated with such instructions. The term "machine-readable storage medium" shall accordingly be taken to include, but not be limited to, solid-state memories, optical and magnetic media, and non-transitory machine-readable storage media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

It should be noted that various modifications and changes may be made to these example embodiments without departing from the broader spirit and scope of the present embodiment.

As used herein, the term, "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments. In general, structures and functionality presented as separate resources in the example configurations may be implemented as a combined structure or resource.

Similarly, structures and functionality presented as a single resource may be implemented as separate resources. These and other variations, modifications, additions, and improvements fall within a scope of the example embodiments as represented by the appended claims. The specification and drawings are, accordingly, to be regarded in an illustrative rather than a restrictive sense.

What is claimed is:

1. A system comprising:

a source machine including one or more hardware processors;

a software application preinstalled and preconfigured on the source machine, the software application including a machine-independent portion and a machine-dependent portion;

a rapid deployment preparation module, implemented by the one or more hardware processors, configured to archive only the machine-independent portion of the software application; and a rapid deployment module, implemented by the one or more hardware processors, configured to:

unpack the archive and install the archived machine-independent portion of the software application on a target machine, generate missing data for the unpacked archive on the target machine, the missing data comprising target-machine specific data, and reconstruct the machine-dependent portion of the software application on the target machine using the target-machine specific data.

2. The system of claim 1, wherein the software application is one of a plurality of software applications of a business application software suite including a plurality of business software applications.

3. The system of claim 1, wherein the rapid deployment preparation module is configured to split the software application preinstalled and preconfigured on the source machine into the machine-independent portion and the machine-dependent portion.

4. The system of claim 1, wherein the rapid deployment preparation module comprises:

an installation module configured to install a plurality of software packages of the software application on the source machine;

a configuration module configured to configure the installed software packages to ensure that the software packages together form a properly working software application on the source machine;

a cleanup module configured to shut down software components of the installed software packages and to delete content of working directories that contain transient files, the transient files dynamically created when the software application runs on the source machine; and an archive packing module configured to pack remaining software components, application database, and related files on the source machine alter the cleanup module into an archive.

5. The system of claim 4, wherein the rapid deployment module comprises:

an archive unpacking module configured to unpack the archive on the target machine;

a machine-dependent data reconstruction utility module configured to generate the missing data for the unpacked archive on the target machine.

6. The system of claim 5, wherein the archive unpacking module is configured to request parameters to be applied on the target machine post-installation, and to re-initialize a database of the unpacked archive on the target machine.

7. The system of claim 3, wherein the machine-dependent data reconstruction utility module is configured to update a hostname in the unpacked archive, to add a license key for the unpacked archive, to change an administrator's password, and to configure Business Objects Enterprise servers from the unpacked archive.

8. A computer-implemented method comprising:

archiving only a machine-independent portion of a software application preinstalled and preconfigured on a source machine, the software application including a machine-dependent portion of the software application;

unpacking the archive and installing the archived machine-independent portion of the software application on a target machine;

generating missing data for the unpacked archive on the target machine, the missing data comprising target-machine specific data, and reconstructing the machine-dependent portion of the software application on the target machine using the target-machine specific data.

9. The computer-implemented method of claim 8, wherein the software application is one of a plurality of software applications of a business application software suite including a plurality of business software applications.

10. The computer-implemented method of claim 8, further comprising:

splitting the software application preinstalled and preconfigured on the source machine into the machine-independent portion and the machine-dependent portion.

11. The computer-implemented method of claim 8, wherein archiving further comprises:

installing each software package of the software application on the source machine;

configuring the installed software packages to ensure that the software packages together form a properly working software application on the source machine;

shutting down software components of the installed software packages and deleting content of working directories that contain transient files, the transient files dynamically created when the software application runs on the source machine; and packing remaining software components, application database, and related files on the source machine after a cleanup module into an archive.

12. The computer-implemented method of claim 11, further comprising:

requesting parameters to be applied on the target machine post-installation; and re-initializing a database of the unpacked archive on the target machine.

13. The computer-implemented method of claim 11, further comprising:

updating a hostname in the unpacked archive;

adding a license key for the unpacked archive;

changing an administrator's password; and configuring Business Objects Enterprise servers from the unpacked archive.

14. A non-transitory machine-readable storage medium storing instructions which, when executed by at least one processor, performs operations comprising:

archiving only a machine-independent portion of a software application preinstalled and preconfigured on a source machine, the software application including a machine-dependent portion of the software application;

unpacking the archive and installing the archived machine-independent portion of the software application on a target machine;

generating missing data for the unpacked archive on the target machine, the missing data comprising target-machine specific data, and reconstructing the machine-dependent portion of the software application on the target machine using the target-machine specific data.

15. The non-transitory machine-readable storage medium of claim 14, wherein the software application is one of a plurality of software applications of a business application software suite including a plurality of business software applications.

16. The non-transitory machine-readable storage medium of claim 14, further comprising:

splitting the software application preinstalled and preconfigured on the source machine into the machine-independent portion and the machine-dependent portion.

17. The non-transitory machine-readable storage medium of claim 14, further comprising:

installing each software package of the software application on the source machine;

configuring the installed software packages to ensure that the software packages together form a properly working software application on the source machine;

shutting down software components of the installed software packages and deleting content of working directories that contain transient files, the transient files dynamically created when the software application runs on the source machine; and packing remaining software components, application database, and related files on the source machine after a cleanup module into an archive.

18. The non-transitory machine-readable storage medium of claim 14, further comprising:

requesting parameters to be applied on the target machine post-installation;

re-initializing a database of the unpacked archive on the target machine;

updating a hostname in the unpacked archive;

adding a license key for the unpacked archive;

changing an administrator's password; and configuring Business Objects Enterprise servers from the unpacked archive.

* * * * *